United States Patent

Havens et al.

[11] Patent Number: 5,308,962
[45] Date of Patent: May 3, 1994

[54] REDUCED POWER SCANNER FOR READING INDICIA

[75] Inventors: William H. Havens; Charles M. Hammond, Jr.; Andrew Longacre, Jr., all of Skaneateles, N.Y.

[73] Assignee: Welch Allyn, Inc., Skaneateles Falls, N.Y.

[21] Appl. No.: 99,246

[22] Filed: Jul. 28, 1993

Related U.S. Application Data

[63] Continuation of Ser. No. 786,575, Nov. 1, 1991, abandoned.

[51] Int. Cl.$^5$ .......................... G06K 7/10; G06K 7/04
[52] U.S. Cl. ..................... 235/455; 235/462; 235/472
[58] Field of Search ............... 235/455, 462, 472, 467, 235/466

[56] References Cited

U.S. PATENT DOCUMENTS

| | | | |
|---|---|---|---|
| 3,925,639 | 12/1975 | Hester | 250/561 |
| 3,946,241 | 3/1976 | Malinowski | 250/221 |
| 4,072,859 | 2/1978 | McWaters | 250/214 R |
| 4,143,358 | 3/1979 | Neff | 340/136.3 |
| 4,240,064 | 2/1980 | Devchoudhury | 235/455 |
| 4,356,389 | 10/1982 | Quirey et al. | 235/455 |
| 4,639,606 | 1/1987 | Boles et al. | 235/455 |
| 4,743,773 | 5/1988 | Katana et al. | 250/566 |
| 4,933,538 | 6/1990 | Heimann et al. | 235/462 |

OTHER PUBLICATIONS

Ett et al., "Sensing Reading Readiness for Manual Code Reader," IBM Technical Disclosure Bulletin, vol. 15, No. 1, Jun. 1972 p. 321.

*Primary Examiner*—William L. Sikes
*Assistant Examiner*—Toan Tran
*Attorney, Agent, or Firm*—Harris Beach & Wilcox

[57] ABSTRACT

A scanner is provided for reading a target containing indicia, such as bar codes, which includes a means for directing the a light source so that it illuminates a target, a photodetector that generates an electrical signal indicative of the intensity of the detected light, a means for decoding the electrical signal to identify the presence of a target containing a region of relatively high reflectivity, and a means for modifying the level of illumination of the light source either from low to high upon recognition of said region of relatively high reflectivity or from high to low when some predetermined condition, such as the end of the indicia scan, or the passage of a time period without reading indicia, is met.

26 Claims, 4 Drawing Sheets

REDUCED POWER SCANNER FOR READING INDICIA

This is a continuation of copending application Ser. No. 07/786,575 filed on Nov. 1, 1991, now abandoned.

BACKGROUND OF THE INVENTION

This invention relates to a scanner for reading indicia such as bar codes. When used herein "reading indicia" means extracting information from indicia, as in determining the presence and width of black bars and white spaces in reading bar code. More particularly it relates to a scanner for reading indicia such as bar codes, where the illumination level of the light source is maintained at a low value when the scanner is not reading indicia and is modified to a high level when indicia are to be read, the change in illumination level being precipitated by exposure of the scanner to a surface of relatively high reflectivity.

DESCRIPTION OF THE PRIOR ART

A variety of scanners that read indicia such as bar code symbols are known in the art. These include stationary scanners over which the indicia are passed as well as hand-held scanners which are passed over the indicia. Stationary scanners frequently use lasers as optical sources, while hand-held scanners frequently use LEDs, lasers, or lamps. In any case, light is directed toward the target containing the indicia. A photosensor is used to detect the variations in light intensity and produces electrical signals indicative of information or data encoded in the indicia being detected. The electrical signals are in turn decoded and the information concerning the indicia is processed appropriately.

When the light source in such a scanner is operated at a high level of illumination, it naturally results in a greater power draw than it would at a low level. Thus, in a battery powered scanner, the life of the battery depends upon the illumination level of the light source. Hence, it is desirable to operate the device so that the light source draws as little power as is feasible. This can be done by operating the light source at a high illumination level, only as necessary, when indicia are being read, and operating the source at a low illumination level or disabling the source when indicia are not being read.

A number of patents have addressed this issue. U.S. Pat. No. 4,933,538 relates to a laser scanner system which is maintained at low power until variations in the intensity of light (possibly indicating a portion of a bar code) are detected, whereupon the system is modified to reach a high power level at which all the indicia are scanned. This method, unlike that described in the instant invention, is not suitable for rapid scanning using a hand held wand scanner because passage of the wand across indicia only affords a single opportunity to read the indicia.

U.S. Pat. No. 4,143,358 concerns an OCR wand with a photosensor array and a lamp for illumination of the target area. The system is set to a low power state after a time delay when either a black field or an overly long indicium is sensed. The counter for determining the time delay is reset upon sensing the presence of white in the target field. The means for initiating a high power state is via recognition of a white area in the target field. The method for this recognition is not described. The use of a photosensor array adds to cost and complexity, as compared with a single sensor in the instant invention.

U.S. Pat. No. 4,072,859 describes a circuit for supplying power to a portable hand held device for reading alphanumeric data. In order to conserve battery power, it uses a light source and control separate from the OCR electronics. The light source used for detection is pulsed off and on, as compared with that of the instant invention, which remains on at a low power setting. The '859 light source and control does not have the high power requirements of the OCR electronics. However, this duality of light source and control results in a device which is more complex than that of the instant invention.

U.S. Pat. No. 3,925,639 pertains to a bar code reading device which uses pulsed light, periodically energizing the light source and, depending upon whether a signal indicative of bar coded data is read or not, maintaining the light source at a high energy level or de-energizing it. This method requires that upon energizing the light source, the difference between a dark area and one of relatively high reflectivity can be determined. This can be accomplished with relative ease if there is no internal scattering within the optics of the reading instrument, as the reflected signal is either high or low. However, with internal scattering, a more sophisticated determination must be made in order to ascertain if the signal obtained is indicative of an area of higher reflectivity or merely that of scattered light. Thus, this method may involve greater complexity than does the instant invention.

U.S Pat No. 4,072,859 relates both a control circuit and an optical character recognition wand using this circuit. The OCR unit and electronics are disabled, rather than operating in a low illumination state, when a document is not being scanned or processed. The use of two circuits makes for increased complexity in the device.

SUMMARY OF THE INVENTION

It is therefore a primary object of the present invention to provide an improved scanner for reading indicia such as bar codes where the power usage of the battery is reduced during periods where indicia are not being read.

It is a further object of this invention to provide an improved scanner for reading indicia such as bar codes where the power usage of the battery is reduced during those periods where indicia are not being read and where the fact that indicia are to be read can easily be determined.

These and other objects of the present invention are attained by a scanner for reading a target containing indicia, such as bar codes, which includes a source which emits a beam of light, a means for directing the light beam so that it illuminates a target, a means for detecting the light reflected from the target, and for generating an electrical signal indicative of the intensity of the detected light, a means for decoding the electrical signal to identify the presence of a target containing a region of relatively high reflectivity, and a means for modifying the level of illumination of the light source either from low to high upon recognition of said region of relatively high reflectivity or from high to low when some predetermined condition, such as the end of the indicia scan, or the passage of a time period without reading indicia is met.

BRIEF DESCRIPTION OF THE DRAWINGS

For a better understanding of these and other objects of the present invention, reference is made to the detailed description of the invention which is to be read in conjunction with the following drawings, wherein.

DETAILED DESCRIPTION OF THE INVENTION

Figure 1:
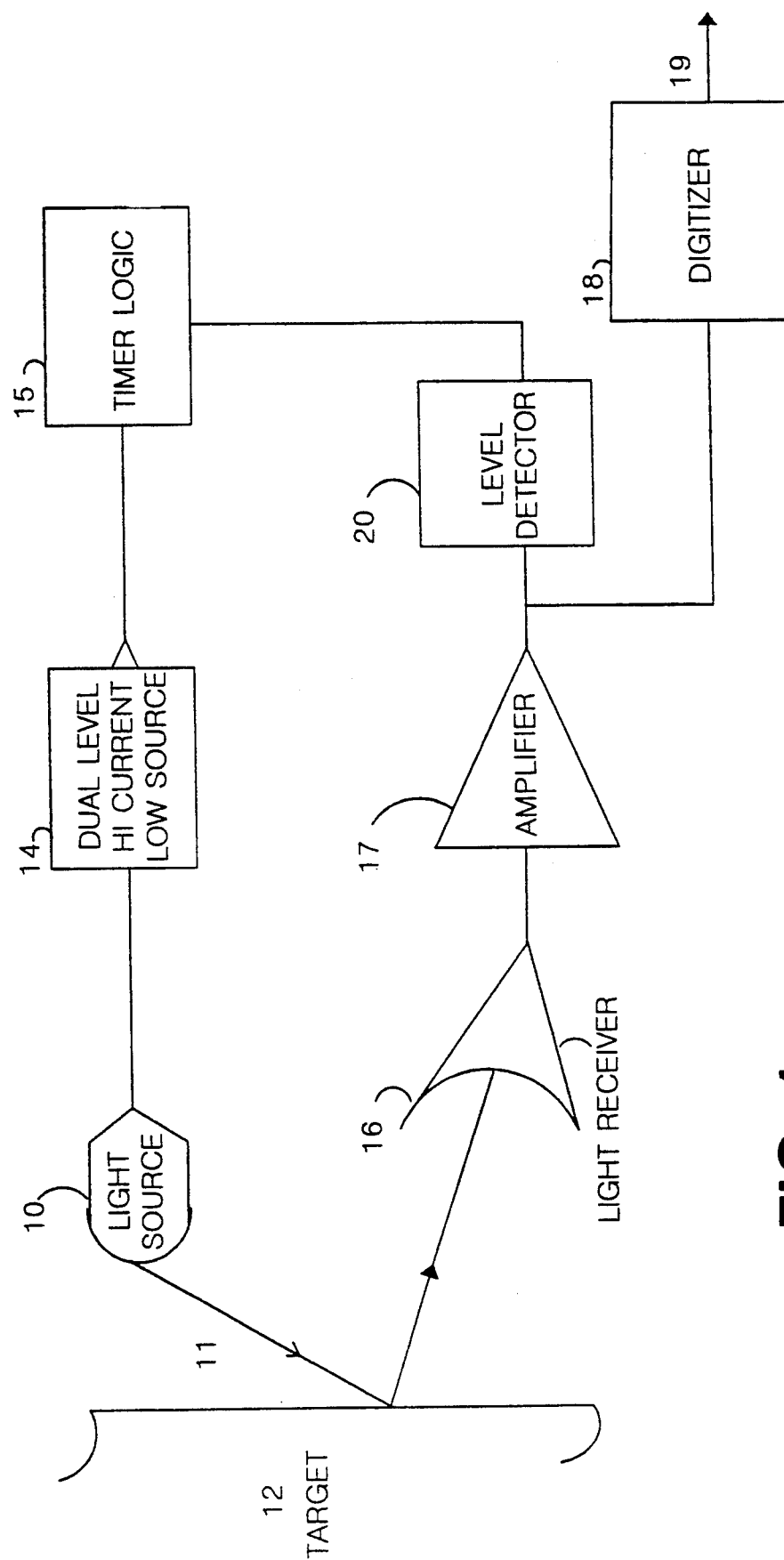
FIG. 1 is an extremely simplified block schematic diagram of one embodiment of the scanner.

Referring now to FIG. 1, there is shown one embodiment of the present invention, this embodiment showing a detector for bar codes. This detector may be in the form of a hand held detector which is passed over a target, or a stationary detector where a target is passed over the detector. Light from a light source 10 which may be a laser, an LED, or a lamp, initially at a low illumination level, is directed along a path 11 to a target. When it first impinges a target of relatively high reflectivity 12 it is reflected back from that target 12 along a path 13 to a light receptor 16. The signal from the receptor 16 is passed through one or more amplifiers 17. The amplifier output is coupled to a level detector 20, which determines from its input signal whether or not the target 12 is of sufficiently high reflectivity to initiate operation of the light source at a high illumination level. The signal from the level detector 20 is presented to the timer logic circuitry 15 and to a dual level current source 14 in order to switch the source 14 from low output to high output. As the target bar code is scanned, now using light at a high illumination level, the output of amplifier of 17, which is coupled to signal processing electronics including a digitizer 18 which converts the analog form signal to a bit serial digital waveform, now presents a meaningful signal which can be transmitted for further processing 19. At the same time, the timer logic 15 determines whether the light received from the target 12 has remained at a substantially constant level for a length of time sufficient to indicate that bar codes are no longer being read. If this is the case, then the dual level current source 14 supplying the light source 10 is reset to a low output state so that illumination is returned to a lower level.

Figure 2:
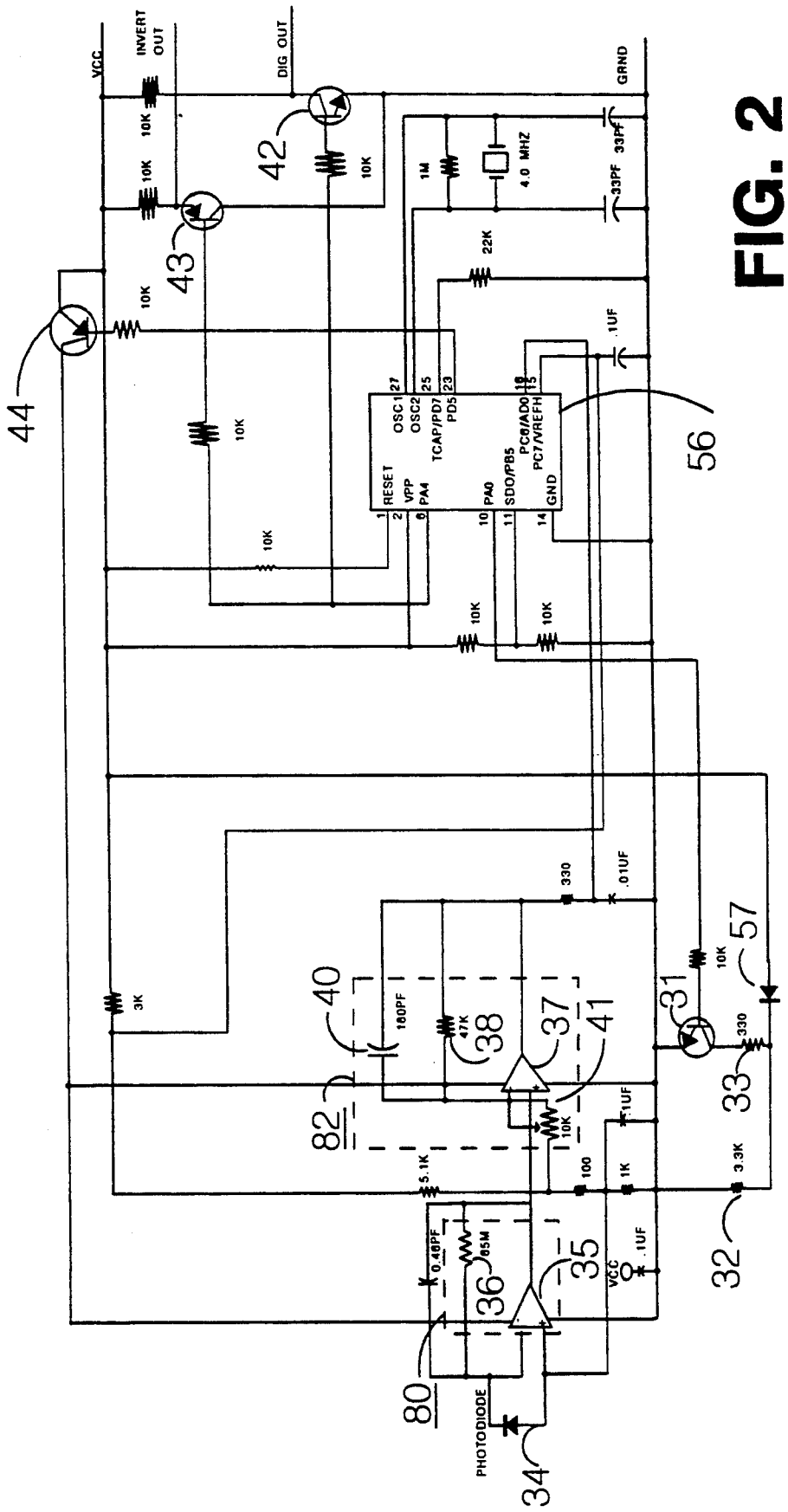
FIG. 2 is a more detailed diagram of one embodiment of the scanner.

Referring to FIG. 2, a more detailed description of one embodiment of this invention is presented. The photodiode 34 receives light and sends out a signal current proportional to the light incident. This signal is received as input to a transimpedence amplifier section 80, consisting of operational amplifier 35 and resistor 36.

The output of the transimpedence amplifier 80 is received as input to a variable gain noninverting amplifier section 82, consisting of operational amplifier 37, resistor 38, capacitor 40, and potentiometer 41. The potentiometer 41 allows the gain of the variable gain noninverting amplifier 82 to be varied. The output of this amplifier 82 is input into the analog to digital converter of the microcontroller 56, containing a microprocessor, a timer, an analog to digital converter, and input/output lines. The microcontroller used in the preferred embodiment was Order Number MC68HC705P9P from Motorola.

The signal from the microcontroller 56 is used to control the transistor 31, as will be described. It is also used to provide noninverted and inverted digitizer output signals via the transistors 42 and 43 respectively. In addition, it signals transistor 44 which functions as a switch turning both the transimpedence amplifier 80 and the noninverting amplifier 82, on or off depending upon the output of the analog to digital converter as read and interpreted by the microcontroller 56.

Transistor 31 functions as an electronic switch which is dependent upon the output of the microcontroller 56. When illumination of the photodiode 34 is low, the output of the microcontroller 56 does not turn on the transistor 31 and current flows through resistor 32 which is 3300 ohms. This maintains the current through the LED 57 at a low level and, thus the LED 57 at a low illumination level. When the illumination of the photodiode 34 reaches a sufficiently high level as reflected in the output of the microcontroller 56, current flows through the transistor 31 to the resistor 33 which is 330 ohms, thus maintaining the current through the LED 57 at a high level and, thus, the LED 57 at a high level of illumination.

Figure 3:
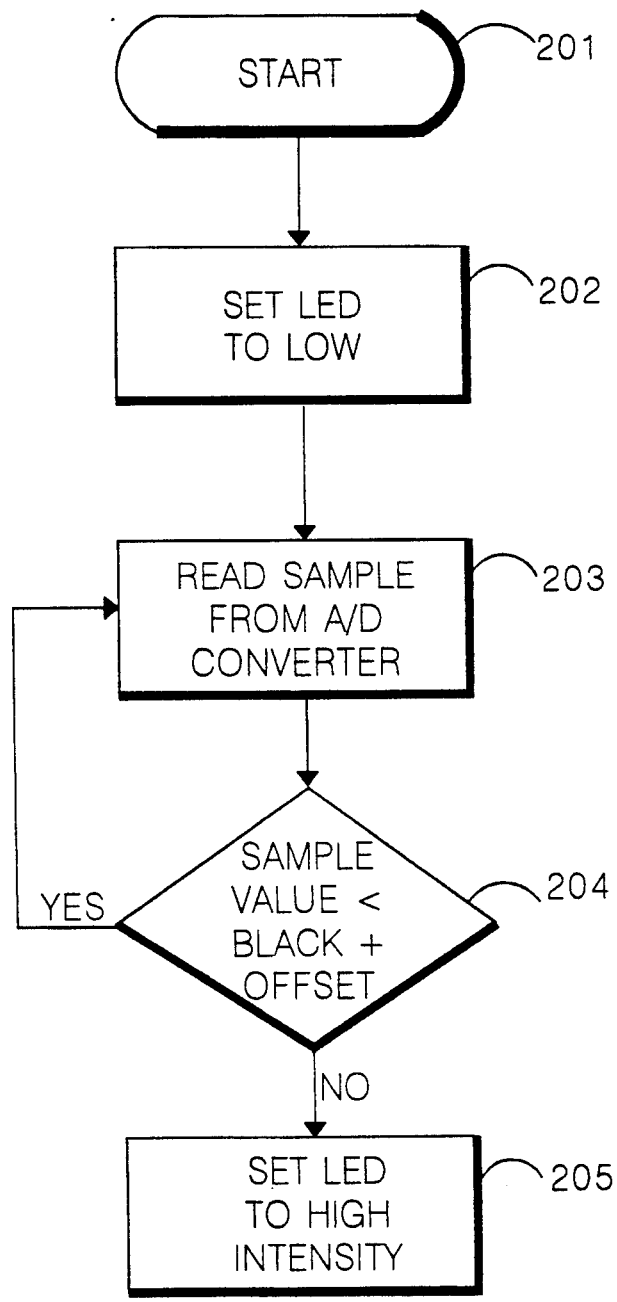
FIG. 3 is a flow chart of one software embodiment of that element of the invention which recognizes, from a sampling of the analog signal, the presence of a target of relatively high reflectivity.

A software embodiment for the detection of a target of relatively high reflectivity is demonstrated in FIG. 3. The device is turned on 201, and the LED set to low intensity 202. A sample is read from the analog to digital converter 203 and tested 204. If the sample value is less than the value for some constant defining a black field plus an optical offset (the threshold), then a new sample is read 203 and tested 204. At such time as the value of the sample read 203 and as tested 204 exceeds this predetermined value, the LED level is set to a high intensity 205. After the microcontroller 56 returns the LED level to the low level (not shown), the cycle is restarted at step 202.

Figure 4:
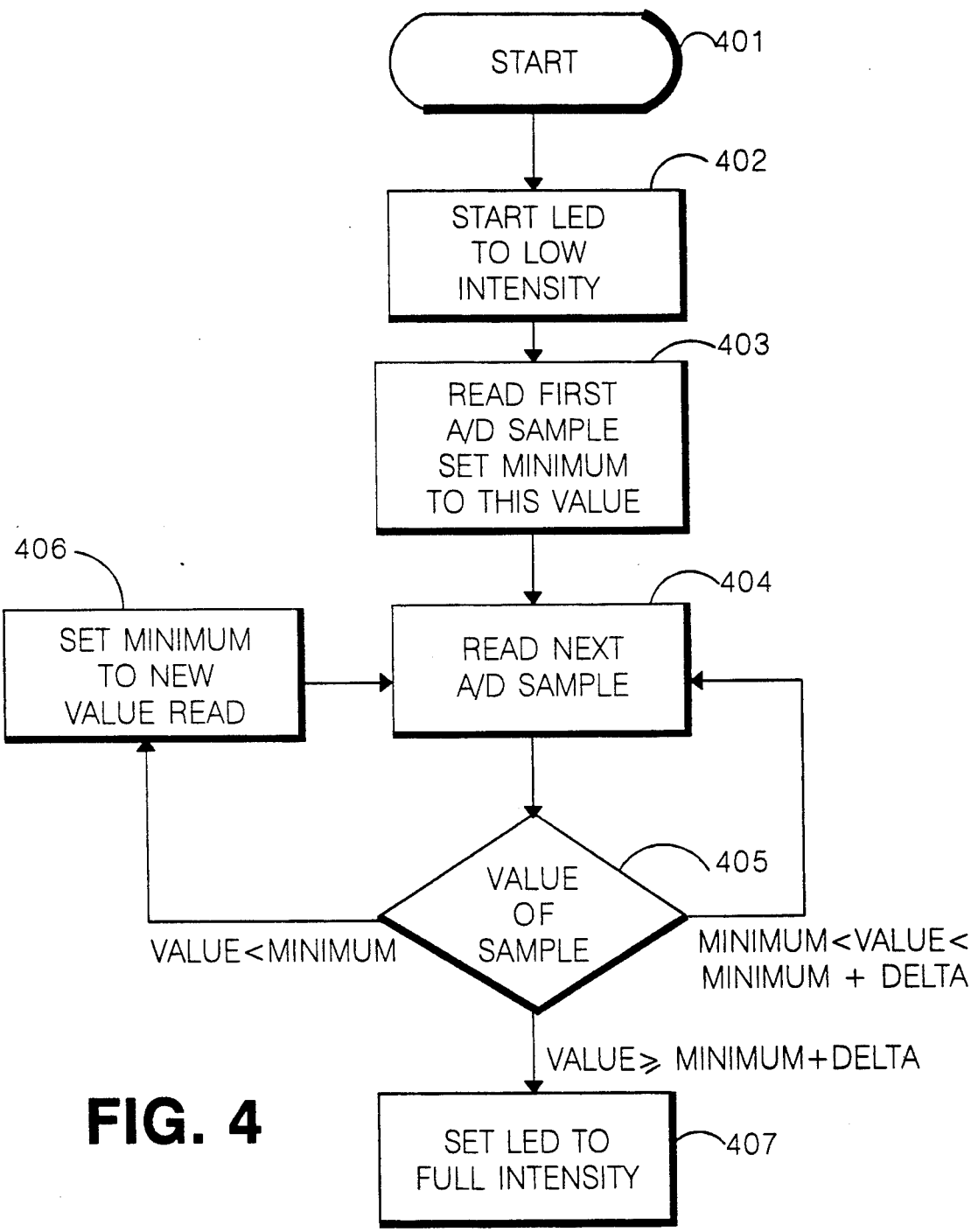
FIG. 4 is a flow chart of another software embodiment of that element of the invention which recognizes, from a sampling of the analog signal, the presence of a target of relatively high reflectivity.

An alternative software embodiment for the detection of a target of relatively high reflectivity is demonstrated in FIG. 4. The device is turned on 401, and the LED set to low intensity 402. A first sample from the analog to digital converter is read and the value of a variable MINIMUM is set to the value of that first sample 403. The next sample from the analog to digital converter is read 404 and its value determined 405. If the value of the analog to digital converter sample is below that of MINIMUM, then the value of MINIMUM is set to the latest analog to digital converter sample 406, before reading the next sample 404. If the value of the analog to digital converter sample is between that of MINIMUM, and MINIMUM plus some predefined delta value, the threshold, then the next sample is read 404 and as tested 405. If, on the other hand, the value of the analog to digital converter sample is greater than that of MINIMUM plus some predefined delta value, then the LED is set to full intensity 407. After the microcontroller 56 returns the LED level to the low level (not shown), the cycle is restarted at step 402.

The software implementations of this invention can eliminate the negative effects of slowly varying signal components, such as may occur when a scanner is moved from a high to a low background light environment while in use. This is accomplished in the alternate embodiment. Other techniques, such as maintaining a running average for deriving a threshold and recognizing that a voltage differential has passed a preset threshold may be used.

Alternatively, in a hardware implementation of this invention, a high pass filer may be placed between the amplifier and the analog to digital converter such that the slowly varying signal components are not passed to the analog to digital converter.

While this invention has been explained with reference to the structure disclosed herein, it is not confined to the details set forth and this application is intended to cover any modifications and changes as may come within the scope of the following claims:

What is claimed is:

1. An apparatus for detecting a target of high reflectivity being present and reading indicia thereon that includes:
    a direct illumination means having a variable output and being arranged to provide direct illumination at a first lower level to a field of view of a photosensor means, said direct illumination means being continuously on at said first lower level and being of sufficient intensity to permit detection of a target of high reflectivity when placed in said field of view, and at a second higher level to permit reading of indicia upon the target;
    said photosensor means arranged to receive reflected illumination, having intensity, from the target and to provide an output signal indicative of the intensity of the reflected illumination;
    low-to-high changing means connected between the direct illumination means and a power supply means for changing current flow through said direct illumination means to change direct illumination output from said direct illumination means from said first level to said second level;
    high-to-low changing means connected between the direct illumination means and the power supply means for changing the current flow through the direct illumination means to change the direct illumination output from said second level to said first level;
    signal processing means to receive said output signal, for determining when said photosensor means detects the target of high reflectivity and activating said low-to-high changing means to change the direct illumination output of said direct illumination means from said first lower level to said second higher level;
    reading means associated with said signal processing means for reading indicia when said direct illumination means is at said second higher level; and
    detection means for detecting compliance with predetermined criteria and activating said high-to-low changing means to change the direct illumination output of said direct illumination means from said second higher level to said first lower level upon compliance with said predetermined criteria.

2. The apparatus of claim 1 wherein said power supply means is a battery means.

3. The apparatus of claim 1 wherein the target is passed across the apparatus so as to be detectable by said photosensor means.

4. The apparatus of claim 1, wherein the apparatus is hand held and the apparatus is passed across the target.

5. The apparatus of claim 1 wherein said signal processing means comprises in part an analog to digital means for converting said output signal, where it is in analog form, to a digital signal.

6. The apparatus of claim 5 wherein said signal processing means further includes a microprocessor means for interpreting said digital signal.

7. The apparatus of claim 1, wherein said signal processing means comprises hardware including an analog comparator.

8. The apparatus of claim 1, wherein said low-to-high changing means and said high-to-low changing means comprise a single switching means.

9. The apparatus of claim 1, wherein said predetermined criteria indicate that reading of said indicia has been completed.

10. The apparatus of claim 1, wherein said predetermined criteria indicate that a preset increment of time has passed without reading of indicia.

11. The apparatus of claim 1, wherein said predetermined criteria involve measurement of a time interval during which the reflected illumination from the target remains appropriately constant.

12. The apparatus of claim 1, wherein said direct illumination means comprises a laser.

13. The apparatus of claim 1, wherein said direct illumination means comprises an LED.

14. The apparatus of claim 1, wherein said direct illumination means comprises a lamp.

15. The apparatus of claim 1, wherein said photosensor means comprises a photodiode.

16. The apparatus of claim 1, wherein said signal processing means comprises hardware means for recognizing that the output signal has exceeded a preset threshold.

17. The apparatus of claim 6, wherein said signal processing means comprises software means for recognizing that the digital signal has passed a preset threshold.

18. The apparatus of claim 17, wherein said software means is capable of recognizing that the digital signal has passed a software determined threshold that eliminates slowly varying components.

19. A method for conserving power usage of a scanner for reading indicia comprising the steps of:
    initially activating a power source for delivering a level of power to a direct illumination source so that said direct illumination source operates at a low, continuously on, level adequate for detecting a target having high reflectivity;
    positioning the scanner and a target having reflectivity so that direct illumination from said direct illumination source falls on the target having reflectivity;
    receiving illumination reflected from the target having reflectivity at a photosensor;
    converting reflected illumination received from the target having reflectivity by the photosensor to an electronic signal which is proportional to the reflectivity of the target having reflectivity;
    analyzing said electronic signal to determine if the target having reflectivity is a target of high reflectivity by virtue of it containing an area having reflectivity equal to or greater than some predetermined reflectivity;
    upon detection of such an area on the target having reflectivity:
    (1) generating a target detected signal;
    (2) changing the level of power delivered by said power source to a high level; and (3) operating the direct illumination source at a high, continuously on level of direct illumination;

reading indicia on the target having high reflectivity; and upon meeting or predetermined criteria:
  (1) generating a criteria met signal;
  (2) changing the level of power delivered by said power source to a low level; and
  (3) operating said direct illumination source a low, continuously on level.

20. The method of claim 19 wherein said predetermined criteria indicates that reading said indicia has been completed.

21. The method of claim 19, wherein said predetermined criteria indicates that a preset increment of time has passed without reading of indicia.

22. The method of claim 19, wherein said predetermined criteria involves measurement of a time interval during which illumination reflected from the target remains appropriately constant.

23. The method as in claim 19, wherein said recognition of the presence of a target having a reflectivity equal to or greater than some preset reflectivity is performed by software in association with a microprocessor, said software being capable of recognizing that the electronic signal has passed a preset threshold.

24. The method of claim 23, wherein said software is capable of recognizing that the electronic signal has passed a software determined threshold that eliminates slowly varying components.

25. The method of claim 19 wherein said indicia comprise bar code.

26. A scanner for reading a target having reflectivity and containing indicia, such as bar code, comprising:

a light source means, having a level of illumination, said light source means emitting a beam of light, said light beam being projected out through the scanner so that the emitted light beam illuminates the target;

a light receiving means for detecting light reflected from the target, the reflected light having intensity indicative of the reflectivity of the target being illuminated, said light receiving means converting the reflected light into an electronic signal indicative of the intensity of said reflected light;

signal processing means for recognizing from said electronic signal the presence of a target having a region having reflectivity equal to or greater than some preset reflectivity;

means for modifying the level of illumination of said light source means, said level of illumination being modified from a continuously on, continuously low output state, insufficient for reading the indicia, to a continuously on high output state, sufficient for reading the indicia, upon recognition of the region having a reflectivity equal to or greater than some preset reflectivity; and being modified from the continuously on continuously high output state to the continuously on continuously low output state based upon predetermined criteria being met; and means for reading the indicia so that recognition of the region having a reflectivity equal to or greater than some preset reflectivity and reading of indicia are performable in a single pass of the scanner with respect to the target.

* * * * *